US011259011B2

(12) United States Patent
Sariarslan

(10) Patent No.: US 11,259,011 B2
(45) Date of Patent: Feb. 22, 2022

(54) DISPLAY DEVICE AND METHOD FOR RENDERING A THREE-DIMENSIONAL IMAGE

(71) Applicant: Vestel Elektronik Sanayi ve Ticaret A.S., Manisa (TR)

(72) Inventor: Muhammet Kürsat Sariarslan, Manisa (TR)

(73) Assignee: Vestel Elektronik Sanayi ve Ticaret A.S., Manisa (TR)

( * ) Notice: Subject to any disclaimer, the term of this patent is extended or adjusted under 35 U.S.C. 154(b) by 0 days.

(21) Appl. No.: 16/628,541

(22) PCT Filed: Dec. 28, 2017

(86) PCT No.: PCT/EP2017/084723
§ 371 (c)(1),
(2) Date: Jan. 3, 2020

(87) PCT Pub. No.: WO2019/007539
PCT Pub. Date: Jan. 10, 2019

(65) Prior Publication Data
US 2020/0221072 A1   Jul. 9, 2020

(30) Foreign Application Priority Data

Jul. 3, 2017  (EP) ..................................... 17179371

(51) Int. Cl.
*H04N 13/393* (2018.01)
*H04N 13/128* (2018.01)
*H04N 13/15* (2018.01)

(52) U.S. Cl.
CPC ......... *H04N 13/393* (2018.05); *H04N 13/128* (2018.05); *H04N 13/15* (2018.05)

(58) Field of Classification Search
None
See application file for complete search history.

(56) References Cited

U.S. PATENT DOCUMENTS 5,793,918 A  *  8/1998  Hogan .................... G09F 19/08
                                                   385/116
6,462,840 B1 * 10/2002  Kravtsov ................. G09F 9/33
                                                   358/474
(Continued)

FOREIGN PATENT DOCUMENTS

GB          2506696 A      4/2014
KR    10-2012-0065779 A    6/2012
(Continued)

OTHER PUBLICATIONS

Battles, A.: "Photo Reading Computer Accessory for the Visually Impaired," Research Disclosure, Kenneth Mason Publications, Hampshire, UK, GB, No. 449, Sep. 1, 2001 (Sep. 1, 2001), p. 1451, XP001128222, ISSN: 0374-4353 (1 page).
(Continued)

*Primary Examiner* — Reza Aghevli
(74) *Attorney, Agent, or Firm* — Brandon V. Zuniga; James R. Gourley; Carstens & Cahoon, LLP

(57) ABSTRACT

A display device (100) has a plurality of display elements (101) arranged in a display plane for rendering a three-dimensional image in accordance with image data (330). Each display element has a pixel (120) and an actuator (130) for moving the pixel normal to the display plane. The actuator of each display element is operable, in response to receiving a position value for the pixel, to move the pixel normal to the display plane in accordance with the position value.

10 Claims, 3 Drawing Sheets

(56) References Cited

U.S. PATENT DOCUMENTS

| | | | | |
|---|---|---|---|---|
| 6,556,201 B1* | 4/2003 | Maehara | | G06T 13/00 345/427 |
| 7,298,370 B1* | 11/2007 | Middler | | G06T 11/206 345/421 |
| 8,552,883 B1 | 10/2013 | Su | | |
| 8,553,019 B2* | 10/2013 | Vogsland | | G09G 3/2088 345/204 |
| 8,908,994 B2* | 12/2014 | Martin | | G06T 15/00 382/285 |
| 8,994,828 B2* | 3/2015 | Kolarov | | H04N 17/004 348/180 |
| 9,225,972 B2* | 12/2015 | Payne | | H04N 13/32 |
| 9,842,434 B2* | 12/2017 | Jiang | | G06T 7/20 |
| 10,067,634 B2* | 9/2018 | Ames | | G06F 3/0487 |
| 10,190,873 B1* | 1/2019 | Yamagami | | G01B 11/2545 |
| 10,593,295 B2* | 3/2020 | Kolarov | | H04N 17/004 |
| 2008/0043003 A1* | 2/2008 | Vogsland | | G09G 3/2088 345/204 |
| 2009/0058806 A1* | 3/2009 | Middler | | G06F 3/0481 345/157 |
| 2009/0130639 A1 | 5/2009 | Skinner | | |
| 2009/0207322 A1* | 8/2009 | Mizuuchi | | H04N 9/3173 348/745 |
| 2010/0103485 A1* | 4/2010 | Haussler | | G03H 1/02 359/9 |
| 2010/0111501 A1* | 5/2010 | Kashima | | G11B 27/3081 386/212 |
| 2010/0118117 A1* | 5/2010 | Kroll | | G03H 1/02 348/40 |
| 2010/0315488 A1 | 12/2010 | Kim et al. | | |
| 2010/0321478 A1* | 12/2010 | Sliwa | | G09G 3/34 348/51 |
| 2012/0013653 A1* | 1/2012 | Vogsland | | G09G 3/00 345/690 |
| 2012/0090005 A1* | 4/2012 | Marlow | | H04N 21/4722 725/42 |
| 2012/0113101 A1* | 5/2012 | Yamamoto | | H04N 13/106 345/419 |
| 2013/0235169 A1* | 9/2013 | Kato | | G02B 27/01 348/53 |
| 2014/0043370 A1* | 2/2014 | Payne | | H04N 13/32 345/690 |
| 2014/0071243 A1* | 3/2014 | Nakatsukasa | | G01B 11/24 348/46 |
| 2014/0085439 A1* | 3/2014 | Niwano | | G02B 30/31 348/56 |
| 2014/0240516 A1* | 8/2014 | Kolarov | | H04N 5/265 348/180 |
| 2015/0082145 A1* | 3/2015 | Ames | | G06F 3/0346 715/234 |
| 2015/0082180 A1* | 3/2015 | Ames | | G06F 3/04815 715/738 |
| 2015/0082181 A1* | 3/2015 | Ames | | G06F 3/0487 715/738 |
| 2015/0279330 A1* | 10/2015 | Kolarov | | H04N 17/00 345/635 |
| 2016/0078670 A1* | 3/2016 | Wu | | G06T 15/205 345/420 |
| 2018/0130201 A1* | 5/2018 | Bernard | | A61B 6/025 |
| 2018/0322628 A1* | 11/2018 | Schroecker | | A61B 8/5207 |

FOREIGN PATENT DOCUMENTS

| | | |
|---|---|---|
| WO | 96/21171 A2 | 7/1996 |
| WO | 2011/029409 A1 | 3/2011 |
| WO | 2014130039 A1 | 8/2014 |

OTHER PUBLICATIONS

English machine translation of KR101221513B1 published on Jun. 21, 2012 (24 pages).

EP Search Report dated Sep. 2, 2020 for EP Application No. 17179371.4 (7 pages).

* cited by examiner

DISPLAY DEVICE AND METHOD FOR RENDERING A THREE-DIMENSIONAL IMAGE

CROSS-REFERENCE TO RELATED APPLICATIONS

This application is a US 371 application from PCT/EP2017/084723 filed on Dec. 28, 2017, which claims priority to EP Application 17179371.4 filed on Jul. 3, 2017, the technical disclosures of which are hereby incorporated herein by reference.

TECHNICAL FIELD

The present disclosure relates to a display device and method for rendering a three-dimensional image.

BACKGROUND

Various devices exist for the generation of three dimensional ("3D") images, commonly relying on the provision of different images to each eye of a user to create the illusion of depth through the stereoscopic effect. For example, different images can be directly provided to each eye, as in virtual reality headset devices.

Alternatively, different components of a single input image can be separated before they reach the user's eyes. This can be achieved in a multitude of different ways, such as polarized glasses, anaglyph glasses, etc. as known in the art.

Other devices exist which are capable of generating 3D images without requiring a viewer of the images to wear a headset. These such devices usually include one or more special panels and have a limited viewing area from which the 3D effect is viewable. It may therefore be difficult or even impossible to generate, with such devices, an image having a satisfactory 3D effect for multiple users simultaneously.

SUMMARY

According to a first aspect disclosed herein, there is provided a display device for rendering a three-dimensional image in accordance with image data, the display device comprising: a plurality of display elements arranged in a display plane, each display element comprising a pixel and an actuator for moving the pixel normal to the display plane; wherein the actuator of each display element is operable in response to receiving a height value for the pixel to move the pixel normal to the display plane in accordance with the height value.

In an example, each display element comprises a pixel guide constraining the movement of the pixel to within a fixed distance normal to the display plane.

In an example, the pixel guides are transparent.

In an example, the pixel of each display element is operable in response to receiving a luminance value to output light in accordance with the luminance value.

In an example, the plurality of pixels are a plurality of colour pixels and the colour pixel of each display element is further operable in response to receiving a colour value to output light in accordance with the colour value.

In an example the pixel of each display element is magnetic or carries a magnet and the actuator of each display element comprises an electromagnetic coil which can be energised to cause the pixel to move.

In an example the display device further comprises a pixel position-extracting portion configured to receive an image file that contains image data and position values for the pixels and to extract therefrom the position values for the pixels.

In an example the display device further comprises a pixel position-extracting portion configured to receive image data and configured to extract the position values by applying a position value generating algorithm to the image data.

In an example the position value generating algorithm comprises an edge detection algorithm for determining a set of pixels that are on detected edges of the image and the pixel position extracting portion is configured to generate larger position values for those pixels in the set.

In an example, the display device further comprises a luminance value extracting portion configured to receive an image file and to extract therefrom the luminance values for the pixels.

According to a second aspect disclosed herein, there is provided a method of rendering a three-dimensional image on a display device comprising a plurality of display elements arranged in a display plane, each display element comprising a pixel and an actuator for moving the pixel normal to the display plane, the method comprising: receiving a position value for the pixel of at least one display element of the display device; controlling the actuator of the at least one display element to move the pixel normal to the display plane in accordance with the position value.

In an example, each display element comprises a pixel guide constraining the movement of the pixel to within a fixed distance normal to the display plane.

In an example, the pixel guides are transparent.

In an example, the pixel of each display element is magnetic or carries a magnet; the actuator of each display element comprises an electromagnetic coil which can be energised to cause the pixel to move; and wherein said controlling the actuator to move the pixel comprises controllably passing an electric current through the electromagnetic coil.

In an example, the method comprises receiving an image file that contains image data and position values for the pixels and wherein said receiving the position value for the pixel comprises extracting the position values for the pixels from the image file.

In an example, the method comprises receiving image data and wherein said receiving the position value for the pixel comprises applying a position value generating algorithm to the image data to generate the position value.

In an example, the position value generating algorithm comprises an edge detection algorithm for determining a set of pixels that are on detected edges of the image and the pixel position extracting portion is configured to generate larger position values for those pixels in the set.

In an example, the method comprises steps of: receiving a luminance value for the pixel of the at least one display element of the display device; controlling the pixel of the at least one display element to output light in accordance with the luminance value.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Existing three-dimensional ("3D") display devices only create the illusion of three-dimensionality when viewed by a human user. That is, there is no display which is really creating 3D pictures or videos. Instead, the headset, panels, and/or other devices just carefully control the light that reaches each of the user's eyes, typically providing separate left and right side images which are effectively combined in the user's brain to give an illusion of the image being 3D. Problems with these methods include the need for glasses or other headwear and/or poor image quality.

Moreover, these known methods do not scale well with respect to the number of people viewing the images. Even in cases where the 3D image itself can be properly rendered to multiple people (such as in a 3D cinema using polarizing glasses), each person views the same 3D image despite being in a slightly different location, and moving will not change the appearance of the 3D image. Real 3D objects do not behave like this; they appear different depending on viewing angle. A further problem with prior art systems is that they can cause headaches and the like for some people, particularly when there is even a slight mis-calibration of the images presented to each eye.

There is disclosed herein a display device that is capable of rendering a real 3D image ("real" in the sense that the depth of different portions of the image really is variable, rather than just a stereoscopic illusion). 3D images created by the present display device therefore overcome the problems outlined above in that they appear 3D to multiple users at once and vary with viewing angle as expected of a real 3D object. These images will also not cause headaches in users because the users really are viewing a 3D object, and not an illusion designed to trick the user's visual system.

Figure 1:
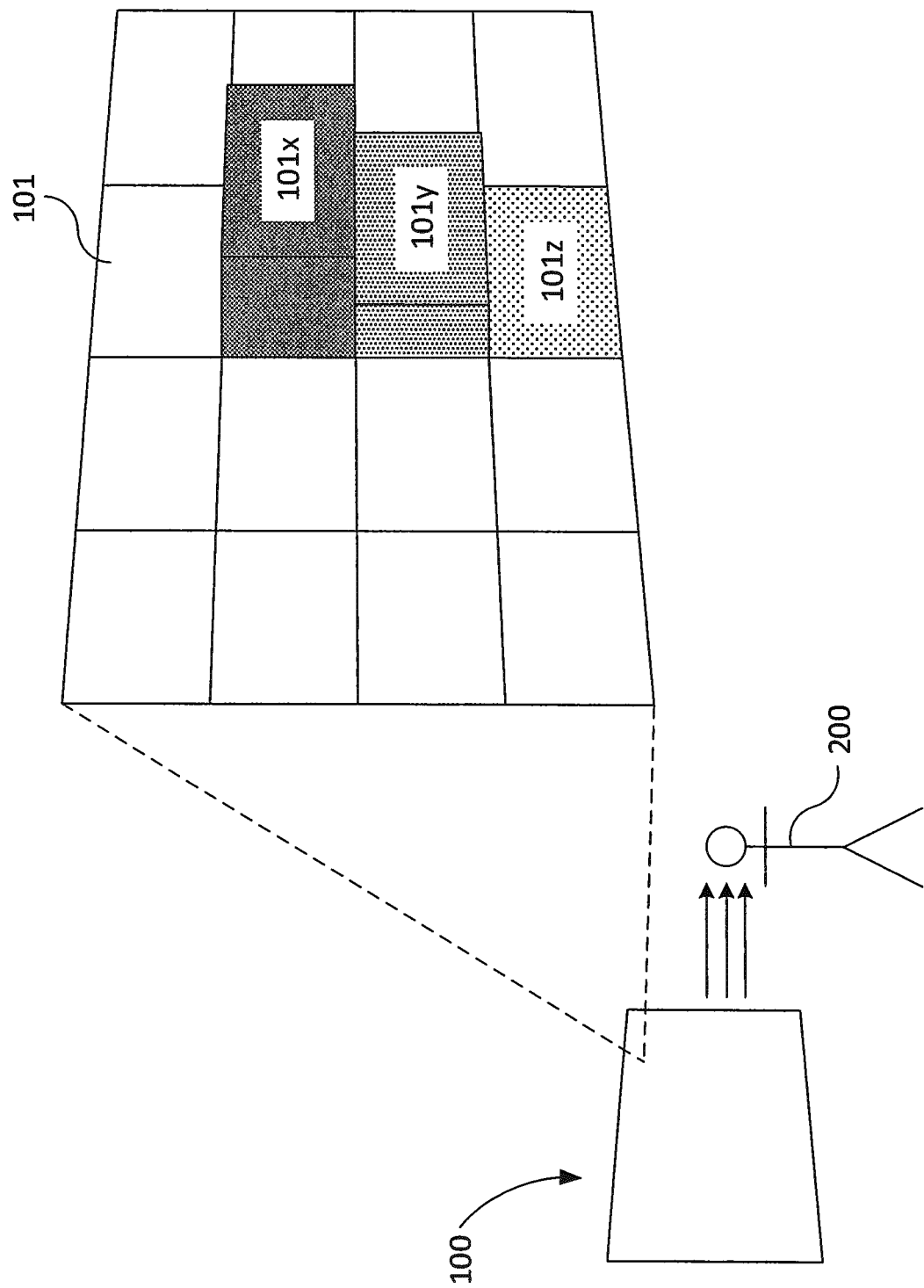
FIG. 1 shows an example of a display device being viewed by a user.

FIG. 1 shows an example of a display device 100 in accordance with aspects described herein. The display device 100 may be comprised in a television, mobile phone, tablet, computer monitor screen, or any other electronic device which may have or be a display or screen.

Figure 2:
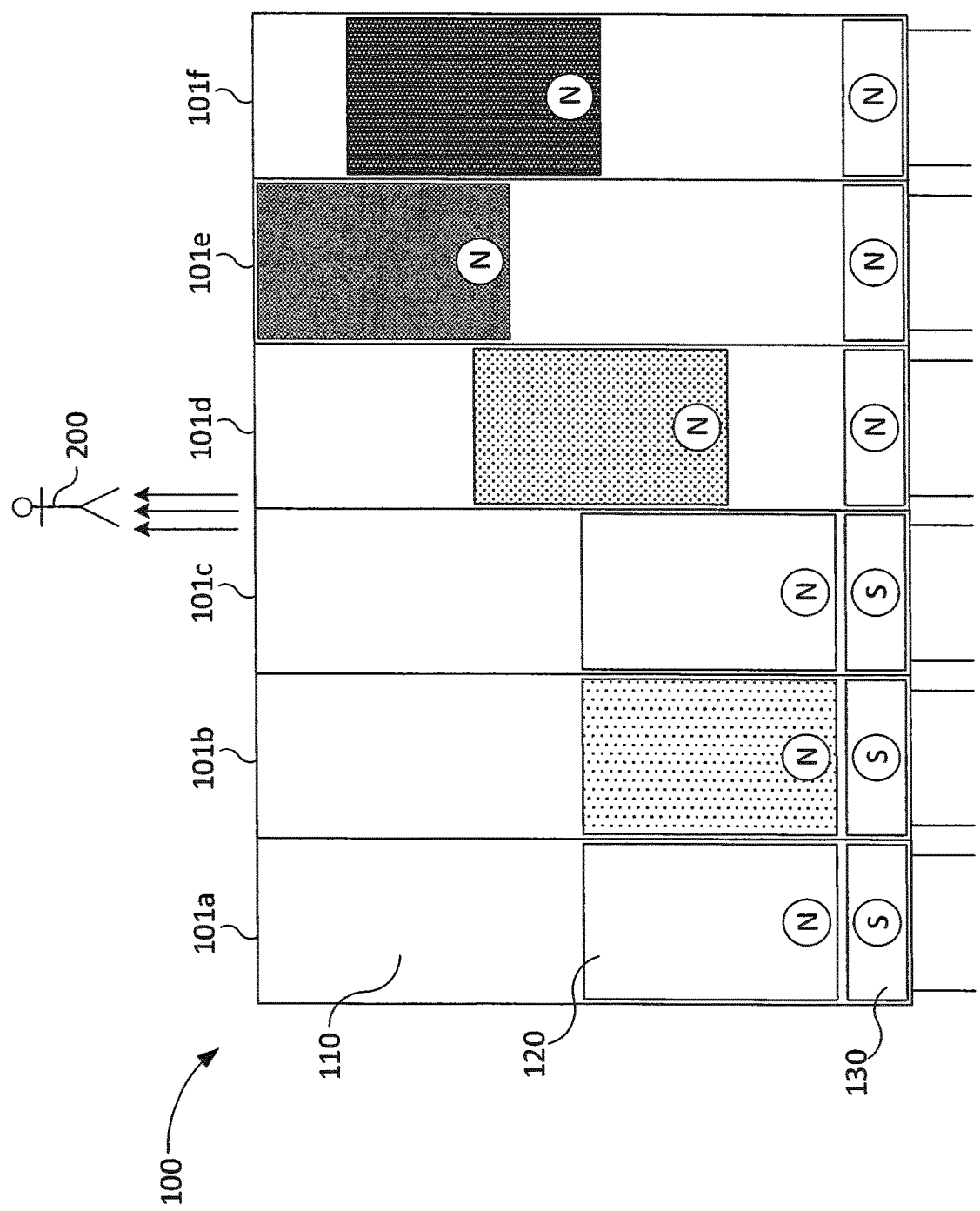
FIG. 2 shows a schematic cross section of the display device of FIG. 1.

The display device 100 comprises a plurality of display elements 101 arranged in a display plane. The display device 100 is designed to be viewed from one side (a viewing side) by a user 200 as shown in FIG. 2. That is, the display device 100 is configured to provide images viewable from the viewing side by the user 200.

Comprised in each display element 101 is a pixel (described in more detail below). The term "pixel" as used herein is used to describe an individual picture element of the display device 100, that is, an element of the display device that produces a corresponding picture element of the image for display. The pixels can be controlled individually to emit light of a specific intensity and/or colour. Hence, to display an image to the user 200, the plurality of pixels comprised in the display device 100 are each controlled to emit light of a specific property such that the desired image is rendered. In this way, the display device 100 is used to display an image, which may be a static and/or moving image.

Various types of pixels for rendering images are known in the art. Some types of pixel comprise a backlight and filters to selectively let through light in order to generate an image, such as in a liquid crystal display (LCD) device. Other types of pixel do not comprise filters and instead directly generate light, such as in an organic light emitted diode (OLED) device.

The pixels of the display device 100 are able to move in a direction normal to the display plane, thus allowing a real 3D image to be rendered. FIG. 1 shows an exploded view of a 4×4 display element section of the display device 100 in which the respective pixels of three display elements 101$x$-$z$ are outputting different colours and are also raised to different heights relative to the display plane. The pixel in display element 101$z$ has not been moved from the display plane and therefore sits at zero "height". The pixel of display element 101$y$ has been moved slightly out of the display plane (towards the user 200, in the viewing direction) and is therefore closer to the user 200 than the pixel in display element 101$z$. The pixel of display element 101$x$ is the "highest" (furthest out of the display plane) shown and is therefore the closest to the user 200. It is therefore understood that these pixels generate a 3D image which can be viewed by the user 200.

FIG. 2 shows a cross section of a portion of the display device 100. In this figure, six display elements 101$a$-$f$ of the display device 100 are shown.

Each display element 101 comprises a pixel 120 and an actuator 130. The pixel 120 is located in a pixel guide 110 and is able to move up and down within the pixel guide 110. FIG. 1 shows pixels 120$a$-$f$ at various different positions within their respective pixel guide 110$a$-$f$ to illustrate this.

The pixel 120 is arranged to output light in accordance with an element of an image to be displayed by the display device 100 when viewed as a whole by the user 200. The pixel 120 is also arranged to move freely (as controlled by the actuator 130) within the pixel guide 110. To output an element, the pixel 130 may comprise for example an OLED pixel or other type of pixel configured to generate light. It is also possible that the pixel 120 may not generate light itself, but filter light generated by a backlight or the like. In these cases, each pixel 120 may comprise its own respective backlight or the display device 100 may comprise one or more backlights which provide backlighting for two or more pixels 120. For example, in these cases, a pixel 120 may be an LCD pixel. The plurality of pixels 120 comprised in the display device 100 may be all of the same type (e.g. all OLED pixels) or may be of two or more types (e.g. some OLED pixels and some LCD pixels comprised in the same display device 100).

In the example shown in FIG. 2, the pixel guides 110 are hollow tubes which may be formed of any suitable material such as plastics, metal, glass, etc. which allows the pixel 120 to move freely within the space inside the pixel guide 110 when acted on by the actuator 130 (see below). The pixel guides 110 may be open at the top (in the viewing direction, towards the user 200, away from the actuator, as shown in FIG. 2) or may be closed. In case the pixel guides are closed, they may be sealed and may also therefore be evacuated such that the inside of the pixel guides 110 are a vacuum. If closed, at least the top of each pixel guide 110 is transparent such that light generated by the pixel 120 can escape to reach the eyes of the user 200. Note that the minimum requirement is that the top of a given pixel guide 110 transmits sufficient light of the wavelength(s) generated by the pixel 120 contained therein that the user 200 is able to discern changes to the intensity of that pixel 120.

The sides of the pixel guides 110 are also preferably similarly. However, even opaque sides will allow for a 3D image to be formed as the user 200 can still view the pixels 120 at different depths in his field of view.

The pixel guides 110 may be short (e.g. one or two millimetres) or may be longer (e.g. one or two centimetres or even more, up to tens of centimetres). The length of the pixel guides 110 may define the maximum distance the pixels 120 can move normal to the display plane and therefore also defines the maximum depth which can be rendered on the display device 100.

The actuator 130 may also be located in the pixel guide 110 as shown in FIG. 2, or may be located outside the pixel guide 110. In yet another alternative, the actuator 130 of a given display element 101 may be integrated with the pixel guide 110. What matters is that the actuator 130 can act to move the respective pixel 120 within the respective pixel guide 110.

The term "actuator" as used herein refers to any arrangement that allows allowing for the position of the pixel 120 within the pixel guide 110 to be controlled. In the example of FIG. 2, the actuator 130 takes the form of an electromagnetic coil located at the bottom of the pixel guide 110. In this example, the pixels 120 are magnetic (e.g. by comprising a permanent magnet portion such as a permanent magnet affixed to the bottom of the pixel 120) such that the bottom (actuator-side) of each pixel 120 presents a north magnetic pole to the actuator 130. It is understood that the principles described herein relating to moving the pixels 120 using electromagnetic induction apply equally to pixels presenting a south magnetic pole to the actuator 130. Similarly, it is also understood that not all pixels 120 need present the same magnetic pole to the actuator 130.

A current through the electromagnetic coil of the actuator 130 will induce a magnetic field around the coil to which the magnetic pixel 120 will react. Hence, by controlling the current through the electromagnetic coil of the actuator 130, a force can be applied to the pixel 120 and therefore the position of the pixel 120 within the pixel guide 110 can be controlled by way of this current. Note that reversing the direction of the current will reverse the polarity of the induced magnetic field and therefore also reverse the direction of the force on the pixel 120 as the magnetic polarity of the pixel 120 is constant.

In the example of FIG. 2, the currents through the actuators 130 are set such that the pixels in the first three illustrated display elements 101a-c are attracted to their respective actuator 130 (the respective actuators generate south magnetic poles which attract the north magnetic poles of the pixels). The currents through the other actuators, of the other three illustrated display elements 101d-f, flow in the opposite direction to those of display elements 101a-c. Hence these actuators generate north magnetic poles which repel their respective pixels. The height of each pixel 120 within its pixel guide 110 can be controlled by varying the amplitude of the current through the actuator 130. Note that in this example it may be preferably for the pixel guides 110 to be constructed out of a material that provides magnetic shielding in order to reduce interference between the magnetic field of one actuator and its neighbours.

Other examples of actuators 130 which may be used to move the pixels 120 include microelectromechanical systems (MEMS) and nano machines. The plurality of actuators 130 present in the display device 100 may comprise a plurality of the same type of actuators 130 or may be comprised of two or more different types of actuator.

Not all sections of the display device 100 need to be movable. That is, some display elements 110 of the display device 100 may be provided with fixed pixels, i.e. conventional pixels which do not have an associated actuator and therefore do not move relative to the display plane. For example, some display elements 101 in one or more subsections of the display device 100 may be capable of rendering 3D effects (i.e. only the display elements 101 that have a respective actuator for varying the position of the respective pixel) and others not. The subsections with 3D-rendering capabilities may or may not be contiguous. For example, a central subsection of the display device 100 may comprise display elements 101 having movable pixels and therefore able to render 3D effects, and the regions towards the edges of the display device 100 may comprise conventional (fixed) pixel elements capable of rendering only 2D pictures.

Figure 3:
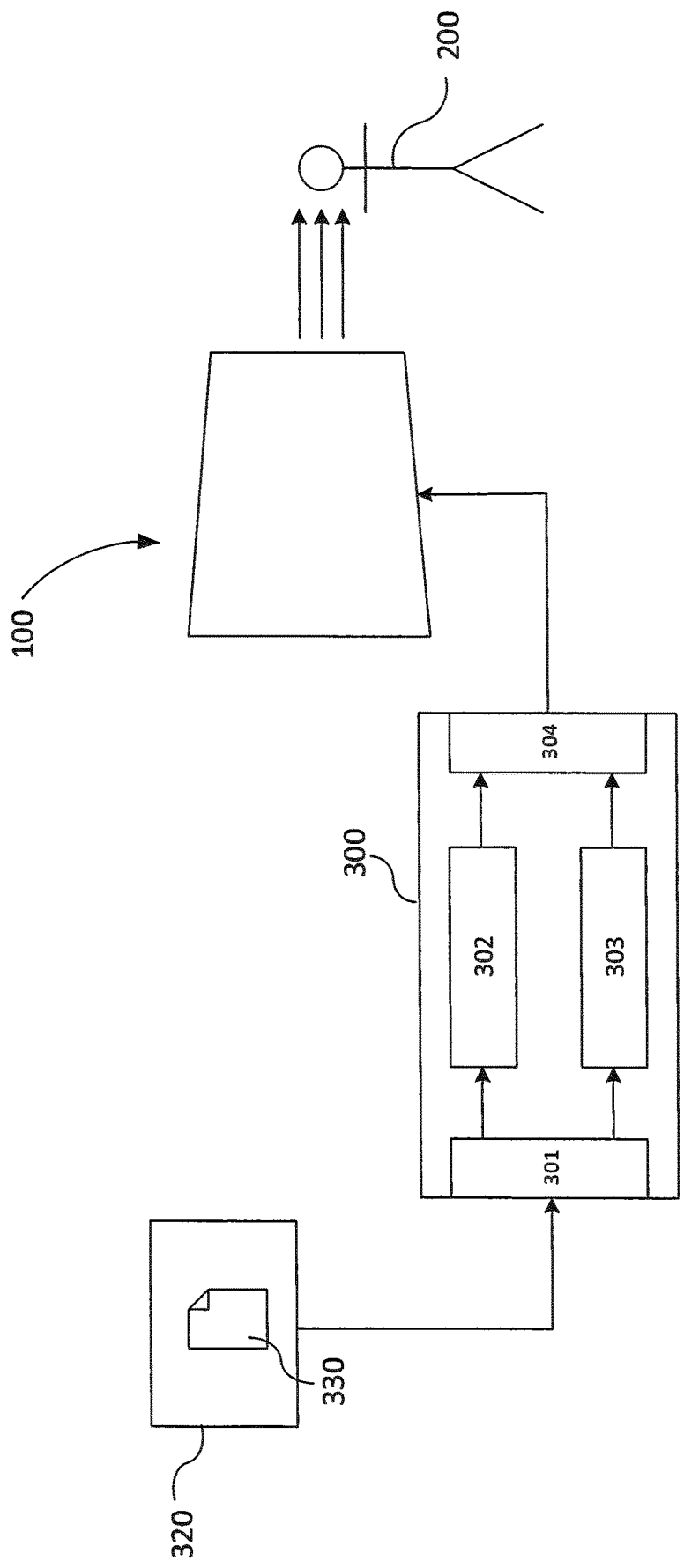
FIG. 3 shows an example of a control system comprising the display device.

FIG. 3 shows an example of a system comprising the display device 100 (as described above in relation to FIG. 1 and FIG. 2), a controller 300, and a media source 320.

The controller 300 is connected to the display device 100 via one or more wired or wireless connections. The controller 300 may be provided as a separate device or may be provided integrally with the display device 100. The controller 300 is also connected to the media source 320. The media source 320 may in an example be a local memory or data storage of the controller 300 and the memory 320 is then preferably connected directly to the controller 300 via, e.g. a hardwired connection.

The media source 320 represents a storage location or data storage for storing an image file 330. The media source 320 may be a computer-readable storage medium such as a CD, DVD, Blu Ray disk, hard disk, flash memory, etc. which stores the image file 330 and is accessible by the controller 300. In such cases, the media source 320 may be connected directly to the controller 300. The media source 320 may instead be one or more servers accessible over a network such as the Internet and which have data storage functionality.

The image file 330 is a computer-readable file defining parameters of an image to be rendered on the display device 100. This may be a static image (e.g. a picture or other graphic), or may be a video image (e.g. a film/movie or other moving picture).

A conventional image file comprises at least luminance information defining individual luminance values to be rendered by a plurality of pixels on a display screen, and may also define chrominance values or other colour information, as known in the art. These values may be encoded and/or compressed as stored in the image file 330.

The image file 330 for rendering by the display device 100 described herein may differ from a conventional image file in that it further defines pixel position information (pixel height information) for use by the controller 300 in controlling the display device 100 to render the image defined in the image file 330, as described herein. In an alternative, the image file 330 may be a conventional image file and the pixel position information may be generated from the image file 330 in accordance with examples described below.

The controller 300 comprises an input 301, an image data extracting portion 302, a pixel position data extracting portion 303, and an output 304. The input 301 is operatively coupled to each of the image data extracting portion 302 and the pixel position data extracting portion 303. The image data extracting portion 302 and the pixel position data extracting portion 303 are each also operatively coupled to the output 304.

The controller 300 and its components as shown in FIG. 3 are represented as a schematic block diagram for the purposes of explaining the functionality of the controller 300 only. Hence, it is understood that each component of the controller 300 is a functional block for performing the functionality ascribed to it herein. Each component may be implemented in hardware, software, firmware, or a combination thereof. Additionally, although described as separate components of the controller 300, some or all of the functionality may be performed by a single piece of hardware, software, or firmware. For example, the image data extracting portion 302 and pixel position data extracting portion 303 may be implemented as a single piece of software executed on one or more processors.

The input comprises one or more physical (e.g. network port) or logical (e.g. hardwired connection) input modules for receiving data from the media source 320. In operation, the input 301 receives the image file 330 and provides it to each of the image data extracting portion 302 and the pixel position data extracting portion 303. The input 301 may perform one or more preliminary processing steps such as decompression on the file 330 before providing it to the image data extracting portion 302 and the pixel position data extracting portion 303.

The image data extracting portion 302 is configured to receive the image file 330 from the input 301 and process it to extract at least luminance information and optionally colour information to be applied to the pixels 120 of the display device 100. This may comprise determining, from the image file 330, a respective value for some or all of the pixels 120 representing the output brightness for that pixel to contribute to the rendering of the image. In standard image files known in the art, this is achieved by storing a value such as an 8-bit value (between 0-255) for each pixel (with a time-varying component for a video file). The value defines how bright the pixel should be controlled to be, e.g. a value of 0 represents "off" or "minimum brightness" and a value of 255 represents "maximum brightness". Similar principles hold for colour values in colour images. The image file 330 may store image data in any of these known ways. The image data extracting portion 302 therefore represents conventional functionality of an image decoder with respect to decoding an image file and controlling pixels of a display to render the brightness and colour of the (two-dimensional) image.

The pixel position extracting portion 303 is configured to receive the image file 330 from the input 301 and process it to extract position information to be applied to at least some of the pixels 120 of the display device 100. The position information may also be referred to as "height" information in that it refers not to the location of a pixel within the plane of the display, but to the offset of the pixel in or out of the display plane (in a direction normal to the display plane). A pixel at a "higher" position is therefore closer to the user 200 on the viewing side of the display device 100 than a pixel at a "lower" position.

The height information can be encoded in the image file 330 along with the image information mentioned above. For example, a height value may be encoded as a value such as an 8-bit value (between 0-255) for each pixel (with a time-varying component for a video file). The value defines how far out of the display plane the pixel should be controlled to be, e.g. a value of 0 represents "zero" or "minimum height" and a value of 255 represents "maximum height".

Alternatively, the pixel position extracting portion 303 may extract pixel height values from a conventional image file (i.e. an image file not explicitly defining such heights). This can be done, for example, by applying edge detection to the image and generating pixel height information defining that all pixels 120 on detected edges be set to maximum height. For example, the outline of icons and other buttons on a touch screen of a mobile device can become raised from the surface of the screen and can therefore by easier for the user 200 to feel and select. As another example, the outline of text may be caused to be raised from the surface of the screen. This is particularly advantageous for blind or partially sighted users. The text may be for example Braille text.

The extracted image and height information are provided to the output 304 to be sent to the plurality of display elements 110 of the display device 100 via a wired or wireless connection. Thereby, the controller 300 controls the display elements 110 to output the respective brightness defined for it in the image information and also to control its pixel 120 to move to the height defined for it in the height information, thus rendering a real 3D image on the display device 100.

It is appreciated that the majority of the above has been described without reference to colour displays. However, it is also appreciated that the pixel 120 of each display element 101 can be provided to output a specific colour of light. Therefore, the principles described herein apply directly to a single colour unit of a colour pixel. That is, a triplet of display elements 101 as described herein can form a single colour pixel, with the display elements being one red, one green, and one blue. Hence, full colour 3D images may be rendered by the display device 100.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors and a digital signal processor or processors, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A display device for rendering a three-dimensional image from a two-dimensional image file which defines a two-dimensional image and which does not include height values, the display device comprising:
a plurality of display elements arranged in a display plane, each display element comprising a pixel and an actuator for moving the pixel normal to the display plane in response to receiving a height value for the pixel; and a processor configured to:
  receive the two-dimensional image file which does not include height values, apply edge detection to the two-dimensional image file to detect edges within the two-dimensional image,
  determine a first set of the pixels of the display device that correspond to detected edges of the two-dimensional image,
  determine a second set of the pixels of the display device that do not correspond to detected edges of the two dimensional image,
  generate first one or more height values for pixels that are in the first set of pixels, and
  generate second one or more height values for pixels that are in the second set of pixels, wherein the first one or more height values are larger than the second one or more height values; and a controller configured to receive the generated height values for the first set of pixels and the second set of pixels from the processor and to control the actuators to move the pixels of the display elements in accordance with the generated height values so that the pixels of the display device that are in the first set of pixels are moved to at least one first height in accordance with the first one or more height values and the pixels in the second set of pixels are moved to at least one second height in accordance with the second one or more height values, each height of the at least one first height being larger than each height of the at least one second height.

2. The display device according to claim 1, wherein each display element comprises a pixel guide constraining the movement of the pixel to within a fixed distance normal to the display plane.

3. The display device according to claim 2, wherein the pixel guides are transparent.

4. The display device according to claim 1, wherein the pixel of each display element is magnetic or carries a magnet and the actuator of each display element comprises an electromagnetic coil which can be energised to cause the pixel to move.

5. A method of rendering a three-dimensional image, from a two-dimensional image file which defines a two-dimensional image and which does not include height values, on a display device comprising a plurality of display elements arranged in a display plane, each display element comprising a pixel and an actuator for moving the pixel normal to the display plane, the method comprising:

receiving the two-dimensional image file which does not include height values;
  applying edge detection to the two-dimensional image file to detect edges within the two-dimensional image;
  determining a first set of the pixels of the display device that correspond to detected edges of the two-dimensional image;
  determining a second set of the pixels of the display device that do not correspond to detected edges of the two-dimensional image;
  generating first one or more height values for pixels that are in the first set of pixels;
  generating second one or more height values for pixels that are in the second set of pixels, wherein the first one or more height values are larger than the second one or more height values; and
  controlling the actuator to move the pixels of the display elements in accordance with the generated height values so that the pixels of the display device that are in the first set of pixels are moved to at least one first height in accordance with the first one or more height values and the pixels in the second set of pixels are moved to at least one second height in accordance with the second one or more height values, each height of the at least one first height being larger than each height of the at least one second height.

6. The method according to claim 5, wherein each display element comprises a pixel guide constraining the movement of the pixel to within a fixed distance normal to the display plane.

7. The method according to claim 6, wherein the pixel guides are transparent.

8. The method according to claim 5, wherein: the pixel of each display element is magnetic or carries a magnet; the actuator of each display element comprises an electromagnetic coil which can be energised to cause the pixel to move; and wherein said controlling the actuator to move the pixel comprises controllably passing an electric current through the electromagnetic coil.

9. The method according to claim 5, further comprising steps of:
  receiving a luminance value for the pixel of the at least one display element of the display device;
  controlling the pixel of the at least one display element to output light in accordance with the luminance value.

10. The display device of claim 1, wherein the pixels are constructed to output light in accordance with an element of an image to be displayed by the display device.

* * * * *